United States Patent [19]

Daniels et al.

[11] 3,852,575

[45] Dec. 3, 1974

[54] STRAPPABLE INACTIVITY TIMER FOR DATA SET

[75] Inventors: Leander Bruce Daniels; Richard D. Fretwell, both of Columbus, Ohio

[73] Assignee: MI$^2$, Inc., Columbus, Ohio

[22] Filed: Mar. 21, 1973

[21] Appl. No.: 343,206

[52] U.S. Cl......... 235/92 T, 235/92 DP, 235/92 CT, 235/92 R, 179/2 DP, 340/248 P

[51] Int. Cl. .............................................. G06m 3/02

[58] Field of Search.......... 235/92 T, 92 PE, 92 CT, 235/92 DP, 92 FQ, 92 TF; 340/172.5, 248 P, 409, 263, 259; 179/2 DP, 3, 4, 2 A, 6 R

[56] References Cited

UNITED STATES PATENTS

| | | | |
|---|---|---|---|
| 3,184,725 | 5/1965 | Siegel et al. | 235/92 CT |
| 3,350,580 | 10/1967 | Harrison | 340/248 P |
| 3,718,764 | 2/1973 | Deschenes | 179/2 DP |

*Primary Examiner*—Gareth D. Shaw
*Assistant Examiner*—Joseph M. Thesz, Jr.
*Attorney, Agent, or Firm*—Cennamo Kremblas & Foster

[57] ABSTRACT

A timer which monitors the inactivity of a data set for clearing and disconnecting an inactive data terminal from connection to another terminal transmission line network after a selected inactivity period has elapsed. A binary timer is reset by the presence of data and a carrier. Selectable combinations of timer output may be strapped to a decoder to permit selection of the inactivity period.

6 Claims, 3 Drawing Figures

| TIME | | | | DELAYS | |
|---|---|---|---|---|---|
| STRAP | | | | DELAY | |
| A | | | | 1 MINUTES | 8 SECOUNDS |
| | B | | | 2 | 15 |
| A | B | | | 3 | 21 |
| | | C | | 4 | 29 |
| A | | C | | 5 | 39 |
| | B | C | | 6 | 48 |
| A | B | C | | 7 | 12 |
| | | | D | 8 | 3 |
| A | | | D | 10 | 11 |
| | B | | D | 11 | 20 |
| A | B | | D | 12 | 28 |
| | | C | D | 13 | 42 |
| A | | C | D | 14 | 48 |
| | B | C | D | 15 | 56 |
| A | B | C | D | 17 | 4 |

STRAPPABLE INACTIVITY TIMER FOR DATA SET

BACKGROUND

The invention relates generally to data terminal equipment and more particularly relates to a control timer for a data set.

Computers communicate with several data terminals located at various facilities. Because computer time is expensive, there is a continuing effort to minimize the computer operating time needed for a machine operation. Additionally it is similarly desirable to eliminate or minimize the time during which the computer is inactive because such inactivity represents an unnecessary expense.

Further time related expense arises because data terminals often communicate through telephone networks. Calls from a local terminal are originated through the conventional telephone exchange equipment. Charges for such communications are assessed by the telephone company on a time basis. Consequently, it is undesirable than an inactive connection be maintained between two data terminals.

Modern data sets contain equipment for automatically operating the data terminals. Such equipment would desirably include a timer which monitors the activity of the data terminals. Desirably, such a timer will automatically disconnect a data terminal and cause it to go to be disconnected from another terminal or central computer whenever data is not being transmitted by either data terminal.

Data terminal equipment must be sufficiently flexible that it will provide excellent service for a great variety of user applications. Consequently, it is desirable that a suitable inactivity period be easily selectable for each terminal installation.

SUMMARY

The invention is a strappable inactivity timer for a data set which is conventionally connected to a 60 Hz power source and includes a carrier detector. The inactivity timer has a strapping terminal board having a plurality of adjacent, non-conductively connected, associated terminal pairs which are selectively connectable. Outputs of selected stages of a muliple stage, binary counter are connected to one of each of said associated terminal pairs. The binary counter has a trigger input connected to 60 Hz pulses from said power source. A first AND gate logic means has its output connected to a reset input of said counter. A first input of said first AND gate logic means is connected to the carrier detector and its second input is connected to the data set circuit at a node where communicated data pulses occur. This first AND gate resets the counter in response to the presence of a carrier anddata bits. Otherwise the counter continues counting. The timer includes a decoding means having inputs connected to the other terminal of each said associated pairs and an output connected to a clear circuit of the data set for clearing the data set in response to actuation of all the stages of the counter to which the inputs of said decoder means are selectively connected.

It is therefore an object of the invention to provide an inactivity timer for a data set.

Another object of the invention is to provide an inactivity timer which is capable of a wide range of timing periods.

Another object of the invention is to provide an inactivity timer permitting easy selection of a desired inactivity timing interval.

Further objects and features of the invention will be apparent from the following specification and claims when considered in connection with the accompanying drawings illustrating the preferred embodiment of the invention.

Figures 1, 2:
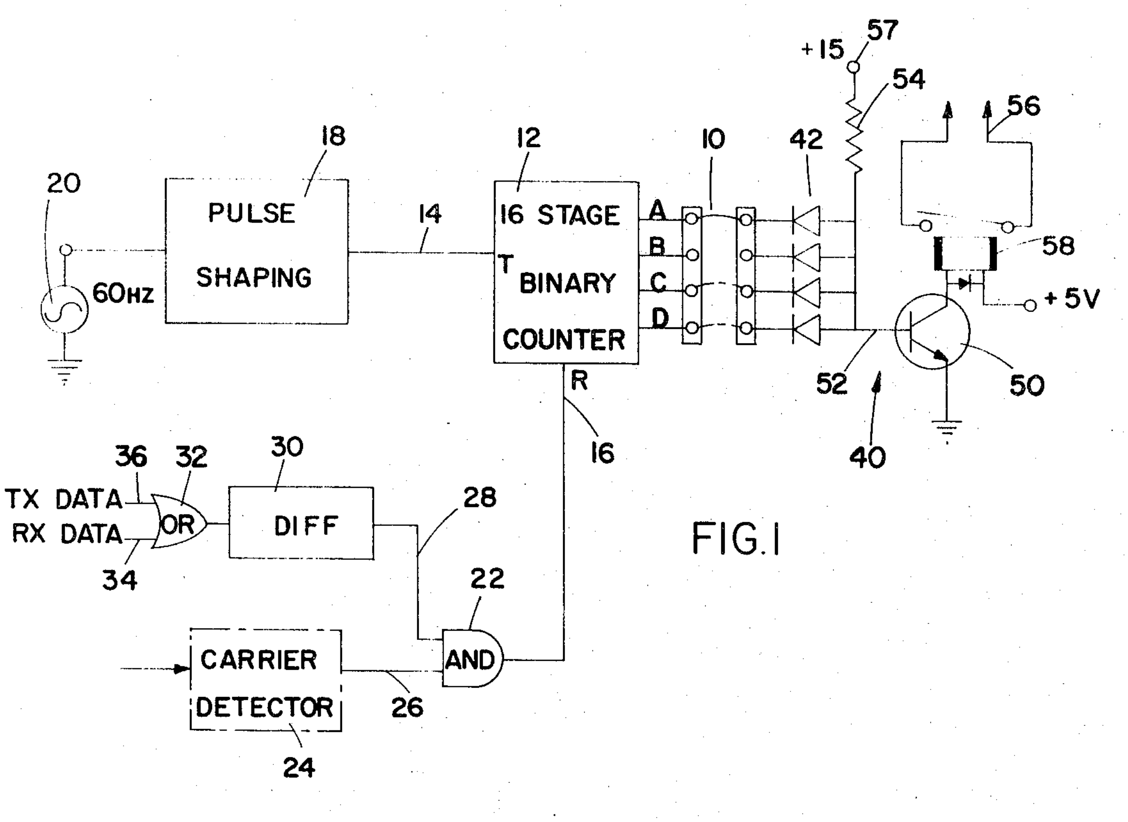
FIG. 1 is a block diagram illustrating a preferred embodiment of the invention.
FIG. 2 is a table illustrating the alternative connections permissible for selecting a wide range of time delays.

In describing the preferred embodiment of the invention illustrated in the drawings, specific terminology will be resorted to for the sake of clarity. However, it is not intended to be limited to the specific terms so selected and it is to be understood that each specific term includes all technical equivalents which operate in a similar manner to accomplish a similar purpose. For example, the term connection, but includes connection through other circuit elements where such connection provides equivalent operation.

DETAILED DESCRIPTION

Referring to FIG. 1, the preferred embodiment of the invention has a strapping terminal board indicated generally as 10 having a plurality of adjacent, non-conductively connected, associated terminal pairs; A, B, C and D. These terminal pairs such as the pair A or the pair B are selectably connectable by means of straps as illustrated for example, in phantom between the terminals of pairs of C and D.

The straps, for example, may each be a length of flexible wire soldered at one end to one terminal of an associated terminal pair. The other end of the wire is soldered to a female connector and a male connector is soldered to the second terminal of each associated pair. In this way, connections between the terminal may be selectively made. Unconnected wires may be mounted to a blind or unused male connector.

A 16 stage binary counter 12 is provided having a trigger input 14 and a reset input 16. The preferred counter has 16 stages and consequently has 6,556 unique sequential states. Preferably, the output terminals of the last four stages of the binary counter 12 are connected to one of each of the associated terminal pairs A, B, C and D.

The trigger input 14 of the binary counter 12 is connected through a pulse shaping circuit 18 to the 60 Hz power source 20 ordinarily connected to a data set. The 60 Hz sinusoidal signal is converted by pulse shaping circuit 18 to a series of pulses which trigger the binary counter 12.

A reset input 16 of the binary counter 12 is connected through an AND gate 22 to a carrier detector 24 which is connected at input 26 of the AND gate 22. The other input 28 of the AND gate 22 is connected through a differentiating circuit 30 to an OR gate 32. The inputs of the OR gate 32 are connected to nodes in the data set where communicated data pulses occur. For example, the input 34 may be connected to a node where received data occurs while the node 36 is connected to a node where transmitted data occurs. Whenever simultaneously a carrier is present and data is being transmitted or received the binary counter 12 is reset.

A decoding means 40 has inputs connected to the other terminal of each of the associated pairs A, B, C and D. Preferably, decoding means 40 comprises a Diode-Transistor-Logic second AND gate 42 having its diode inputs connected to each one of the other terminals of the pairs as illustrated in FIG. 1.

The decoding AND gate 42 includes a transistor 50 having its control input of resistively coupled by a resistance 54 to a biasing source 57 for biasing the transistor in a conducting state. The transistor 50 preferably has the diodes connecting its control input 52 to each of said other terminals of the terminal pairs A, B, C and D.

The transistor 50 controls the clear contacts 56 of a clear relay 58. The decoding means 40 actuates the clear relay 58 for clearing the data set in response to actuation of all the stages of the binary counter 12 to which the inputs of the decoder means are selectively connected or strapped.

In operation, the circuit of FIG. 1 must first have its selected terminal pairs strapped according to the time delay desired. Because the binary counter will count 60 pulses each second, each unique binary number in the counter represents a computable time delay. If the last four stages of a 16 stage binary counter are connected to one of each selected pair as illustrated in FIG. 1, then the time delay illustrated in the table of FIG. 2 will be available. By strapping the combinations corresponding to each delay, the AND gate 42 will detect the binary number corresponding to the selected time delay. The unconnected number corresponding to the selected time delay. The unconnected diodes in the AND gate 42 will have no effect on the circuit's operation.

Figure 3:
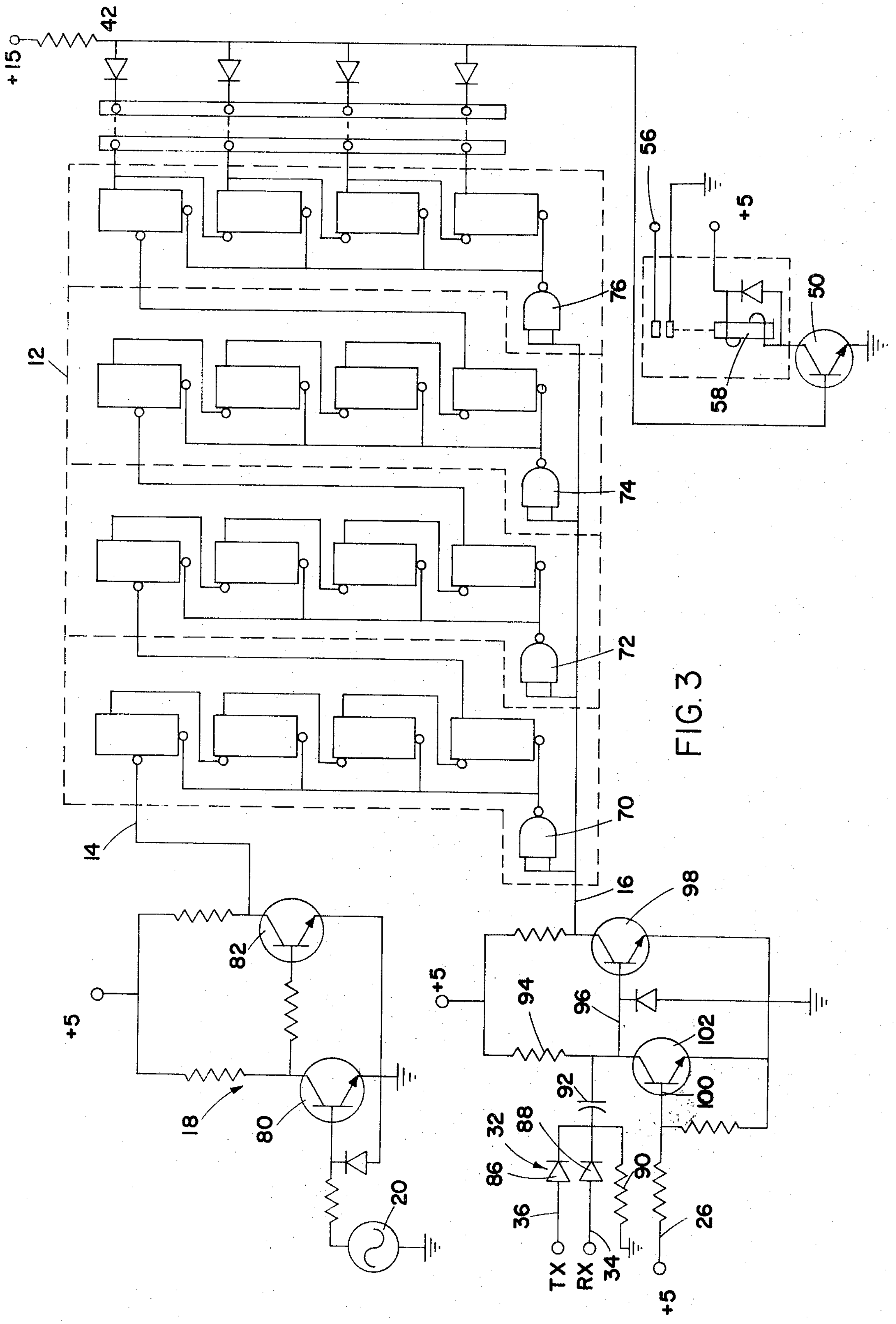
FIG. 3 is a schematic logic diagram of the preferred embodiment of the invention.

FIG. 3 illustrates the 16 stage binary counter which is reset at its reset terminal 16 through inverter connected nand gates 70 72, 74 and 76.

The pulse shaping circuitry 18 includes transistors 80 and 82 for half-wave rectifying, clipping and squaring the input sinusoids from the power supply 20 to apply rectangular pulses to the trigger input 14 of the binary counter 12.

The OR gate 32 includes diodes 86 and 88 and resistance 90. It is connected through a differentiator circuit, formed by capacitance 92 and resistance 94, to the input 96 of transistor 98. The carrier detector input 26 is connected to the control input 100 of transistor 102.

The circuit of FIG. 3 operates as the circuit of FIG. 1. The input sinusoids from the power supply 20 are squared by the pulse shaping circuit 18 and applied to the trigger input 14 of the stage binary counter 12. The presence of a carrier at the carrier input 26 applies a zero volt logic level to the input 26 to maintain the transistor 102 in a nonconducting state. Thus, when a carrier is present, the transistor 102 is effectively disconnected from the circuit. Transmitted or received data pulses applied at inputs 34 or 36 are converted to spikes appearing at the input 96 of transistor 98. The negative spikes at the input 96 turn off transistor 98 and thereby cause reset of the binary counter 12. If data is not present the spikes will not be present and transistor 98 will be on, placing a zero level at output 16. Therefore, the counter will not be reset. Similarly, the absence of a carrier will apply a +5 volt, +24 volt or other suitable logic level from the modem logic to the input 26 to bring the transistor 102 into conduction and thereby clamp the transistor 98 in a nonconducting state. When the transistor 98 is clamped in a nonconducting state the resetting voltage level transitions can not be applied to the reset input 16 of the binary counter 12. The timer will therefore time out and clear the data terminal.

It is to be understood that while the detailed drawings and specific examples given describe a preferred embodiment of the invention, they are for purposes of illustration only, that the apparatus of the invention is not limited to the precise details and conditions disclosed and that various changes may be made therein without departing from the spirit of the invention which is defined by the following claims.

What is claimed is:

1. A strappable inactivity timer for a data set, said data set being connected to a 60 Hz power source and having a carrier detector, the timer comprising:

a. a strapping terminal board having a plurality of adjacent, non-conductively connected, associated terminal pairs which are selectively connectable;

b. a multiple stage binary counter having a trigger input connected to 60 Hz pulses from said power source and having outputs of selected stages connected to one of each of said associated terminal pairs;

c. a first AND gate logic means having its output connected to a reset input of said counter having a first input connected to said carrier detector and a second input connected to the data set circuit at a node where communicated data pulses occur, for resetting said counter in response to the presence of a carrier and of data bits; and d. decoding means having inputs connected to the other terminal of each of said associated pairs and an output connected to a clear circuit of said data set for clearing said data set in response to actuation of all of stages of said counter to which the inputs of said decoder means are selectively connected.

e. an OR gate having one input connected to a source of transmitted data bits and another input connected to a source of received data bits;

f. a differentiator circuit with its input connected to the output of said OR gate and its output connected to said second input of said first AND gate.

2. An inactivity timer according to claim 1 wherein said decoding means comprises a diode-transistor-logic second AND gate having a plurality of diode inputs each connected to one of said other terminals.

3. An inactivity timer according to claim 2 wherein said second decoding AND gate comprises a transistor having a control input resistively coupled to a source for biasing the transistor in a conducting state, wherein said diodes connect said control input to each of said other terminals and wherein said transistor controls the clear contacts of a clear relay.

4. An inactivity timer according to claim 2 wherein said counter comprises a 16 stage counter and wherein the outputs of the last four stages corresponding to the four most significant digits are connected to said strapping terminal board.

5. An inactivity timer according to claim 1 wherein said second AND gate comprises a transistor having a control input resistively coupled to a source for biasing the transistor in a conducting state, wherein said diodes of said second AND gate connect said control input to each of said other terminals and wherein said transistor controls the clear contacts of a clear relay.

6. An inactivity timer according to claim 5 wherein said counter comprises a 16 stage binary counter and wherein the outputs of the last four stages corresponding to the four most significant digits are connected to said strapping terminal board.

* * * * *